US009128334B1

(12) United States Patent
Chen et al.

(10) Patent No.: US 9,128,334 B1
(45) Date of Patent: Sep. 8, 2015

(54) LIQUID CRYSTAL DISPLAY PANEL AND DISPLAY APPARATUS USING THE SAME

(71) Applicant: Shenzhen China Star Optoelectronics Technology Co., Ltd., Shenzhen (CN)

(72) Inventors: Yin-Hung Chen, Shenzhen (CN); Xia Tian, Shenzhen (CN); Pei Jia, Shenzhen (CN)

(73) Assignee: Shenzhen China Star Optoelectronics Technologies Co. Ltd., Shenzhen (CN)

( * ) Notice: Subject to any disclaimer, the term of this patent is extended or adjusted under 35 U.S.C. 154(b) by 0 days.

(21) Appl. No.: 13/703,384

(22) PCT Filed: Nov. 23, 2012

(86) PCT No.: PCT/CN2012/085188
§ 371 (c)(1),
(2) Date: Dec. 11, 2012

(87) PCT Pub. No.: WO2014/067197
PCT Pub. Date: May 8, 2014

(30) Foreign Application Priority Data

Nov. 5, 2012 (CN) .......................... 2012 1 0436205

(51) Int. Cl.
G02F 1/1335 (2006.01)
G02F 1/1343 (2006.01)
G02F 1/13363 (2006.01)

(52) U.S. Cl.
CPC ...... *G02F 1/134309* (2013.01); *G02F 1/13363* (2013.01); *G02F 1/133528* (2013.01); *G02F 2001/133638* (2013.01); *G02F 2001/134345* (2013.01); *G02F 2413/02* (2013.01)

(58) Field of Classification Search
CPC ................................................ G02F 1/133707
See application file for complete search history.

(56) References Cited

U.S. PATENT DOCUMENTS

| | | | | |
|---|---|---|---|---|
| 6,735,017 | B1 * | 5/2004 | Acosta et al. | 359/489.07 |
| 7,589,813 | B2 * | 9/2009 | Chen et al. | 349/129 |
| 7,821,608 | B2 * | 10/2010 | Shinichi et al. | 349/144 |
| 8,179,507 | B2 * | 5/2012 | Park et al. | 349/114 |
| 8,982,305 | B2 * | 3/2015 | Kang | 349/129 |
| 9,036,122 | B2 * | 5/2015 | Kim et al. | 349/141 |
| 2009/0310075 | A1 * | 12/2009 | Kim | 349/144 |
| 2010/0182556 | A1 * | 7/2010 | Oh et al. | 349/127 |
| 2011/0310335 | A1 * | 12/2011 | Hashimoto et al. | 349/96 |
| 2012/0113344 | A1 * | 5/2012 | Kim et al. | 349/41 |
| 2013/0128168 | A1 * | 5/2013 | Kim et al. | 349/42 |
| 2013/0242239 | A1 * | 9/2013 | Chang et al. | 349/106 |
| 2013/0258256 | A1 * | 10/2013 | Kim et al. | 349/102 |

* cited by examiner

*Primary Examiner* — Timothy L Rude
(74) *Attorney, Agent, or Firm* — Mark M. Friedman

(57) ABSTRACT

The present invention provides a liquid crystal display (LCD) panel and a display apparatus using the same. The LCD panel comprises a first substrate, a second substrate, a liquid crystal layer and quarter wave (λ/4) pattern retarder films. The second electrode of the second substrate comprises first sub-pixels and second sub-pixels. When images are displayed by the pixels, a voltage difference between a first voltage of the first sub-pixels and a second voltage of the second sub-pixels is inversely proportional to a grayscale of the images displayed by the pixels. The present invention can mitigate the viewing angle problem of the pixels.

15 Claims, 7 Drawing Sheets

LIQUID CRYSTAL DISPLAY PANEL AND DISPLAY APPARATUS USING THE SAME

FIELD OF THE INVENTION

The present invention relates to a field of a liquid crystal display technology, and more particularly to a liquid crystal display (LCD) panel and a display apparatus using the same.

BACKGROUND OF THE INVENTION

Liquid crystal displays (LCDs) have been widely applied in electrical products. Currently, most of LCDs are backlight type LCDs which comprise a liquid crystal panel and a backlight module. The liquid crystal panel is composed of two transparent substrates and a liquid crystal sealed there-between, and the liquid crystal panel have pixels for displaying images.

At present, a vertical alignment (VA) technology has been developed for LCD panels, and has some advantages, such as wide viewing angle, high aperture ratio, high contrast and simple process.

However, when the images of the VA type LCD is viewed from the front or obliquely, the displayed image effects will be different at different viewing angles, and especially in a normally black mode, the viewing angle problem is more prominent, thereby greatly deteriorating a display quality of the LCD.

As a result, it is necessary to provide an LCD panel and a display apparatus using the same to solve the problems existing in the conventional technologies, as described above.

SUMMARY OF THE INVENTION

The present invention provides an LCD panel and a display apparatus using the same to solve the viewing angle problem existing in the conventional LCD.

A primary object of the present invention is to provide a liquid crystal display panel used in normally black mode, and the liquid crystal display panel comprises: a first substrate comprising a first electrode; a second substrate comprising a second electrode, wherein the second electrode has a plurality of pixels, and each of the pixels comprises a first sub-pixel and second sub-pixel, and the first sub-pixel includes a first trunk portion and plurality of first branch portions, and an angle between the first trunk portion and the first branch portions is equal to 45 degrees, and the second sub-pixel includes a second trunk portion and plurality of second branch portions, and an angle between the second trunk portion and the second branch portions is in the range of 10 degrees to 80 degrees except 45 degrees; a liquid crystal layer formed between the first substrate and the second substrate; a first polarizer disposed at an outer side of the first substrate; a second polarizer disposed at an outer side of the second substrate; and two quarter wave pattern retarder films disposed between the first substrate and the first polarizer, and between the second substrate and the second polarizer, respectively, wherein the quarter wave pattern retarder films comprise a plurality of quarter wave retarder rows and a plurality of zero wave retarder rows, and the zero wave retarder rows are positioned to the first sub-pixels, and the quarter wave retarder rows are positioned to the second sub-pixels; wherein, when images are displayed by the pixels, a first voltage is applied to the first sub-pixels, and a second voltage is applied to the second sub-pixels, and a voltage difference between the first voltage and the second voltage is inversely proportional to a grayscale of the images displayed by the pixels, and the first voltage is higher than the second voltage.

A further object of the present invention is to provide a display apparatus comprising a backlight module and the above-mentioned liquid crystal display panel.

In one embodiment of the present invention, the angle between the second trunk portion and the second branch portions is in the range of 35 degrees to 55 degrees except 45 degrees.

In one embodiment of the present invention, the angle between the second trunk portion and the second branch portions is in the range of 36 degrees to 38 degrees.

In one embodiment of the present invention, the angle between the second trunk portion and the second branch portions is in the range of 48 degrees to 52 degrees.

In one embodiment of the present invention, a width of the zero wave retarder rows is the same to a width of the first sub-pixels, and a width of the quarter wave retarder rows is the same to a width of the sub-pixels.

In one embodiment of the present invention, an area of the first sub-pixel is equal to or larger than an area of the second sub-pixel.

In one embodiment of the present invention, the voltage difference between the first voltage and the second voltage is higher than 1 V when the brightness of the images displayed by the pixels is lower a predetermined brightness.

In one embodiment of the present invention, the voltage difference between the first voltage and the second voltage is in the range of 1V to 3V when the brightness of the images displayed by the pixels is lower than the predetermined brightness.

In the LCD panel and the display apparatus using the same of the present invention, with the use of the different branch angles and the different driving voltages of the different sub-pixels in the pixels, the viewing angle problem of the pixels can be mitigated. Moreover, with the use of the pixel electrode structure, the color shift problem of the VA type LCD apparatus can be improved.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
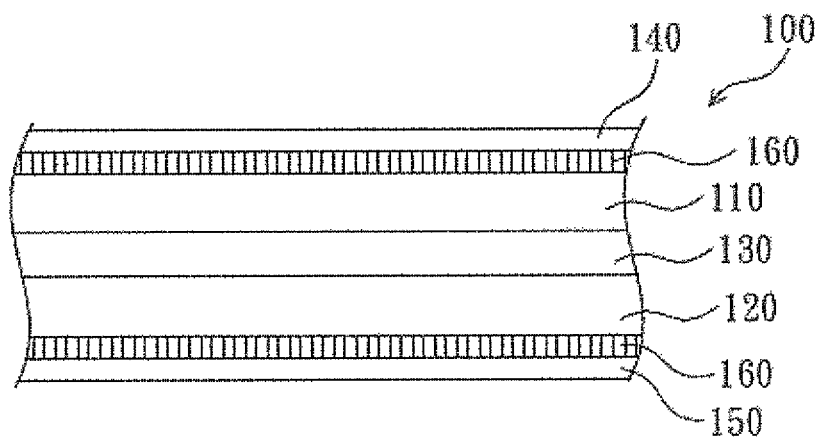
FIG. 1 is a cross-sectional view showing a liquid crystal display panel according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It will be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top on the basis of a gravity direction.

Referring to FIG. 1, a cross-sectional view showing a liquid crystal display (LCD) panel according to one embodiment of the present invention is illustrated. The display apparatus of the present embodiment can comprises the liquid crystal display panel 100 and a backlight module (not shown). The liquid crystal display panel 100 is disposed opposite to the backlight module, and the backlight module may be realized as a side lighting backlight module or a bottom lighting backlight module to provide the liquid crystal display panel 100 with the back-light. The liquid crystal display panel 100 may be a VA type liquid crystal display panel, such as a PSVA type liquid crystal display panel or a pattern vertical alignment (PVA) type liquid crystal display panel.

Referring to FIG. 1 again, the liquid crystal display panel 100 may comprise a first substrate 110, a second substrate 120, a liquid crystal layer 130, a first polarizer 140 and a second polarizer 150 and two quarter wave (λ/4) pattern retarder films 160. The liquid crystal layer 130 is formed between the first substrate 110 and the second substrate 120. That is, the liquid crystal layer 130 is positioned at inner sides of the first substrate 110 and the second substrate 120. The first polarizer 140 is disposed at an outer side of the first substrate 110, and the second polarizer 150 is disposed at an outer side of the second substrate 120. The λ/4 pattern retarder film 160 is disposed between the first substrate 110 and the first polarizer 140, and between the second substrate 120 and the second polarizer 150, respectively.

Referring to FIG. 1, the first substrate 110 and the second substrate 120 may be realized as glass substrates or flexible plastic substrates. The first substrate 110 may be a glass substrate or other material substrate with color filters (CF), and the second substrate 120 may be a glass substrate or other material substrate with a thin film transistor (TFT) array. It notes that the CF and the TFT array may also be disposed on the same substrate in other embodiments.

Figure 2:
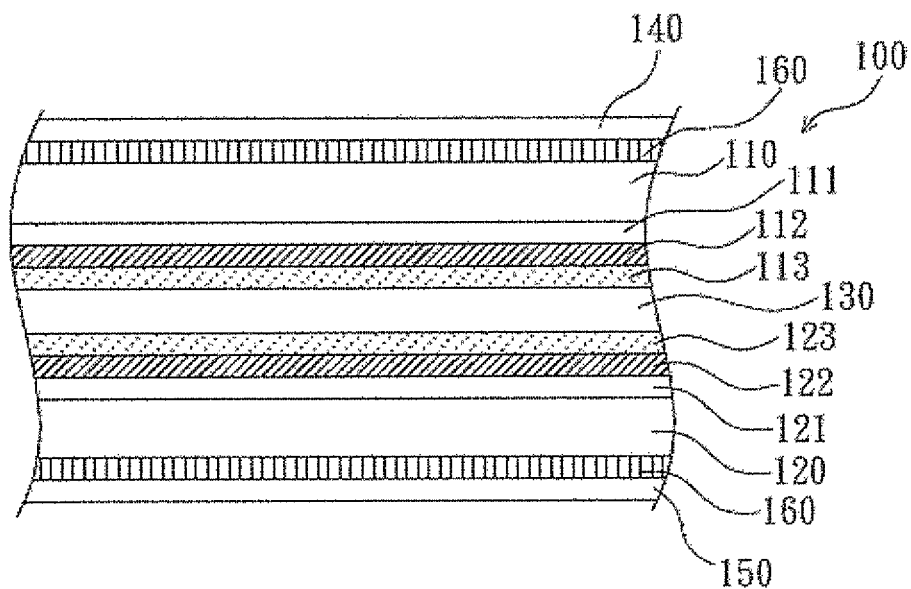
FIG. 2 is a cross-sectional view showing a PSVA type liquid crystal display panel according to one embodiment of the present invention.

Referring to FIG. 2, a cross-sectional view showing a PSVA type liquid crystal display panel according to one embodiment of the present invention is illustrated. In this embodiment, the liquid crystal display panel 100 may be, for example, a PSVA type liquid crystal display panel. At this time, the liquid crystal layer 130 can include reactive monomers and liquid crystal molecules. The reactive monomers are preferably photo-sensitive monomers mixed with the liquid crystal molecules. The first polarizer 140 is disposed on one side of the first substrate 110 and opposite to the liquid crystal layer 130 (i.e. a light-emitting side of the first substrate 110). The second polarizer 150 is disposed on one side of the second substrate 120 and opposite to the liquid crystal layer 130 (i.e. a light-incident side of the second substrate 120).

Referring to FIG. 2 again, in this embodiment, the liquid crystal display panel 100 may be the PSVA type liquid crystal display panel, and the first substrate 110 can comprise a first electrode 111, a first alignment layer 112 and a first polymer alignment layer 113, and the second substrate 120 can comprise a second electrode 121, a second alignment layer 122 and a second polymer alignment layer 123. The first alignment layer 112 and the first polymer alignment layer 113 are formed on the first electrode 111 in sequence. The second alignment layer 122 and the second polymer alignment layer 123 are formed on the second electrode 121 in sequence. The first electrode 111 and the second electrode 121 are preferably made of a transparent and electrically conductive material, such as ITO, IZO, AZO, GZO, TCO or ZnO. A voltage can be applied to the liquid crystal molecules of the liquid crystal layer 130 by the first electrode 111 and the second electrode 121. In this embodiment, the first electrode 111 may be a common electrode, and the second electrode 121 may be a pixel electrode. In addition, the second electrode 121 can have a plurality of regions, and the voltage applied to each of the regions may be the same or different. The alignment layers 112, 122 and the polymer alignment layers 113, 123 can have an alignment direction for determining the orientation of the liquid crystal molecules of the liquid crystal layer 130. The alignment layers 112, 122 and the polymer alignment layers 113, 123 can have a pre-tilt angle, wherein the pre-tilt angle is less than 90 degrees, preferably less than 60 degrees. The alignment layers 112, 122 are formed on the substrates 110, 120, respectively. The polymer alignment layers 113, 123 are polymerized of the reactive monomers bonded with the alignment layers 112, 122.

Figure 3:
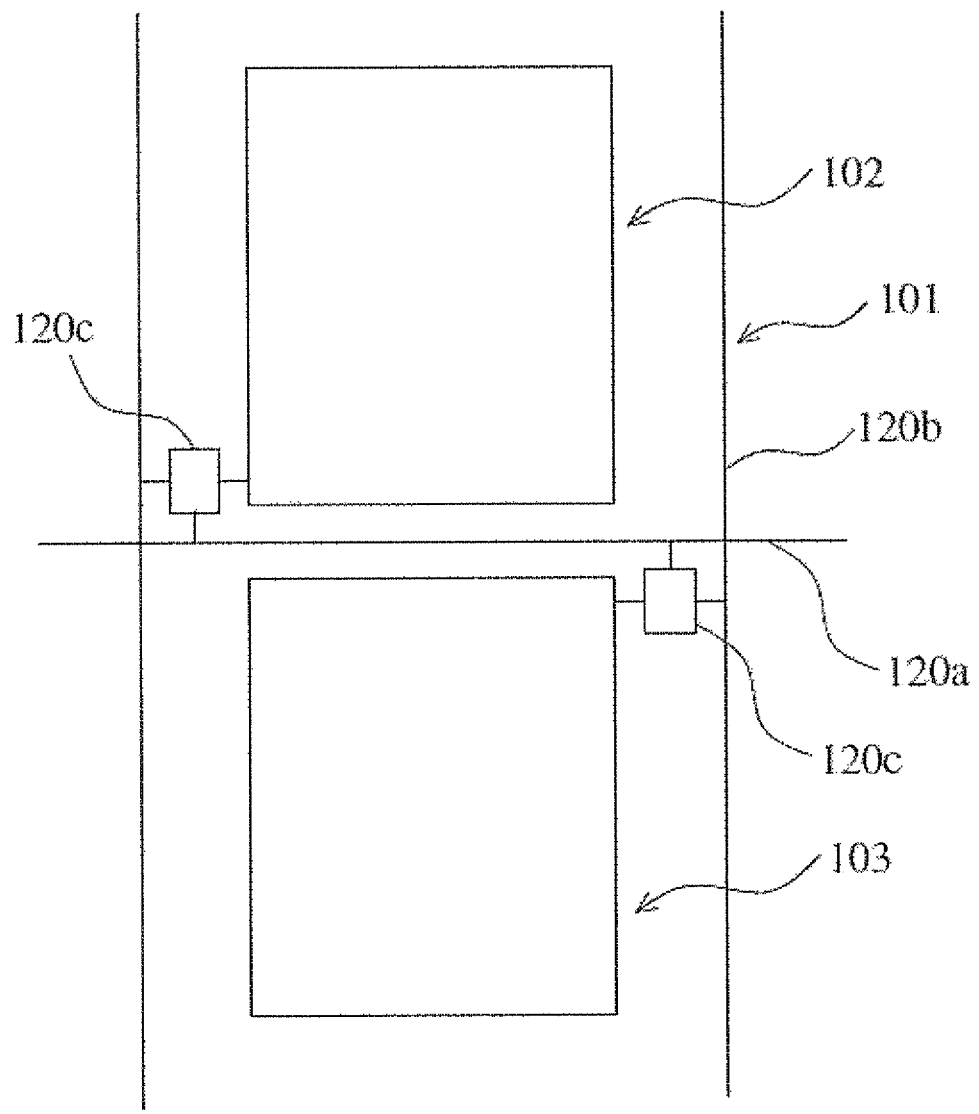
FIG. 3 is a layout view showing pixels of the liquid crystal display panel according to one embodiment of the present invention.
Figure 4:
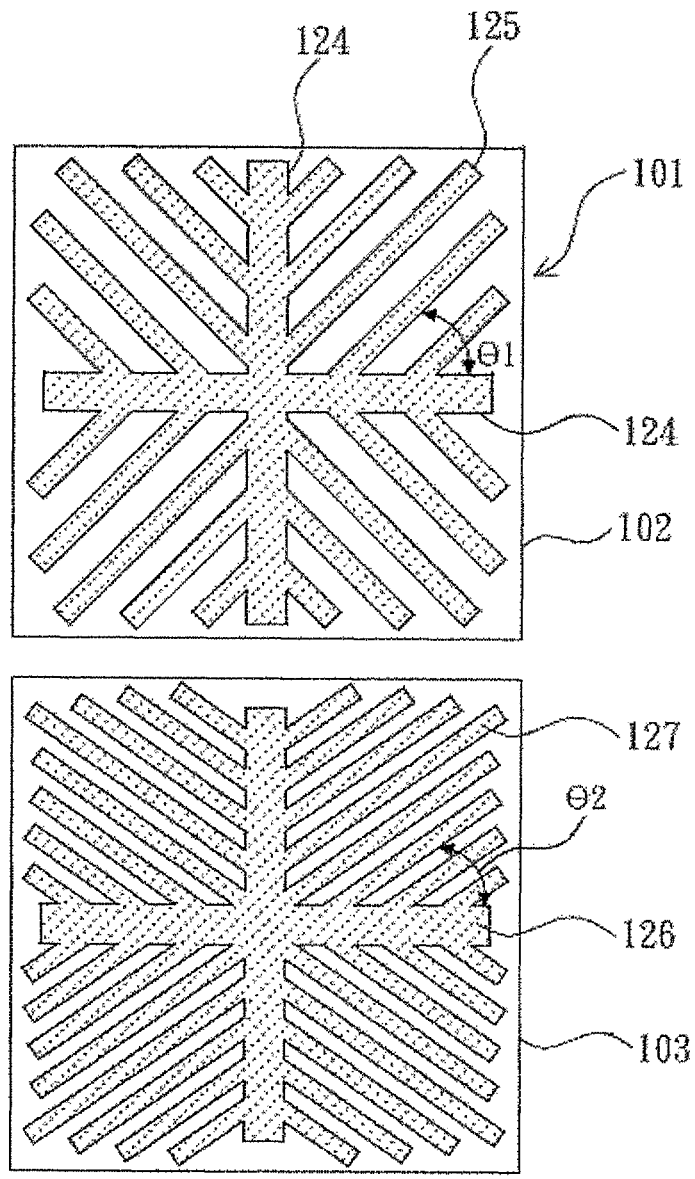
FIG. 4 is a schematic diagram showing a pixel electrode structure of the liquid crystal display panel according to one embodiment of the present invention.
Figure 5:
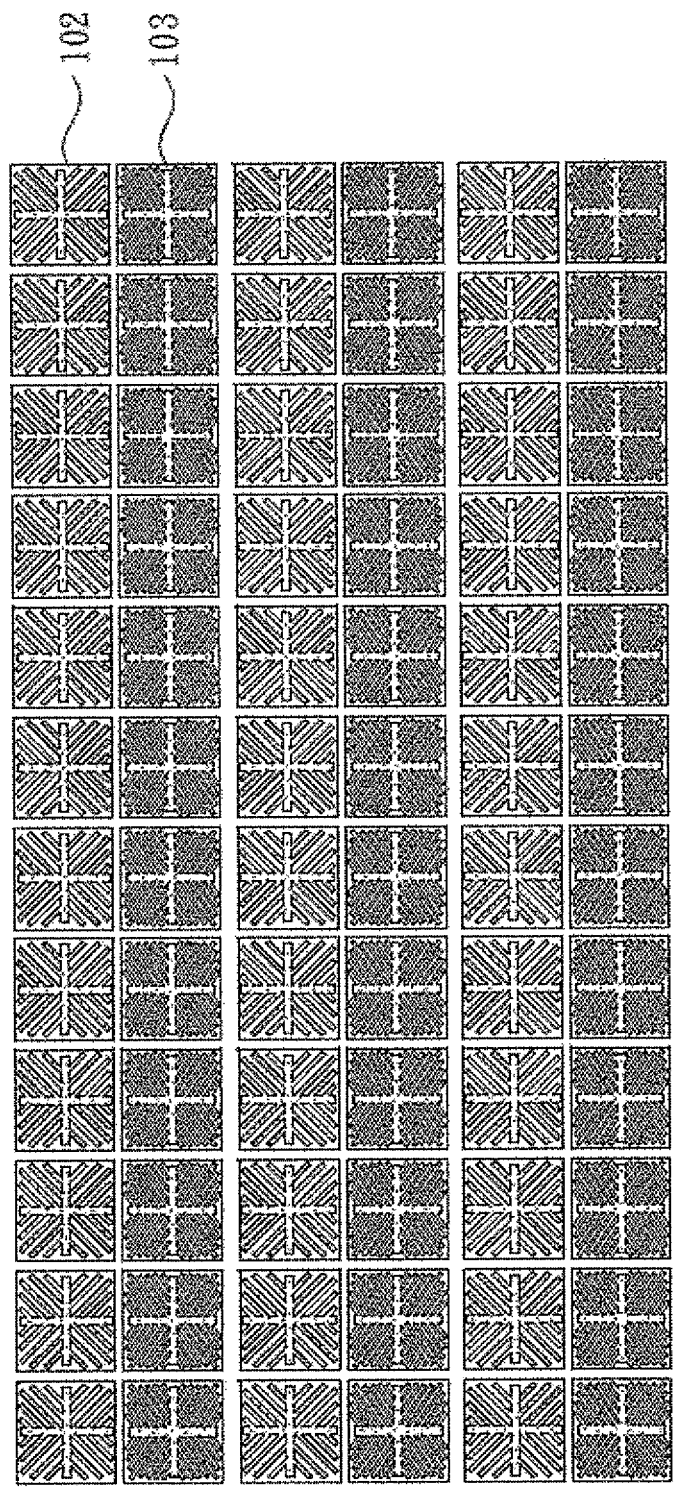
FIG. 5 is a schematic diagram showing first sub-pixels and sub-pixels of the liquid crystal display panel according to one embodiment of the present invention.

Referring to FIG. 3 through FIG. 4, FIG. 3 is a layout view showing pixels of the liquid crystal display panel according to one embodiment of the present invention, and FIG. 4 is a schematic diagram showing a pixel electrode structure of the liquid crystal display panel according to one embodiment of the present invention, and FIG. 5 is a schematic diagram showing first sub-pixels and second sub-pixels of the liquid crystal display panel according to one embodiment of the present invention. The second substrate 120 comprises a plurality of signal lines 120a, 120b and active elements 120c. The signal lines 120a and 120b may be gate lines and data lines, which are crisscrossed to form a plurality of pixels 101 arranged in an array. The active elements 120c may be thin film transistors (TFTs) disposed in the pixels 101 and electrically connected to the signal lines 120a, 120b and pixel electrodes of the pixels 101, respectively. Each of the pixels 101 has a first sub-pixel 102 and a second sub-pixel 103, wherein an area of the first sub-pixel 102 is preferably equal to larger than an area of the second sub-pixel 103. A pixel electrode structure in each of the first sub-pixel 102 comprises a first trunk portion 124 and a plurality of first branch portions 125. A pixel electrode structure in each of the second sub-pixel 103 comprises a second trunk portion 126 and a plurality of second branch portions 127. The first trunk portion 124 and the second trunk portion 126 may be crisscross patterns, and each of the first sub-pixels 102 and the second sub-pixels 103 is divided into four pixel region units by the trunk portions 124 and 126. The branch portions 125 and 127 obliquely extend from the trunk portions 124, 126, and are arranged parallel to each other. In this case, an angle θ1 between the first trunk portion 124 and the first branch portions 125 in the first sub-pixels 102 is equal to 45 degrees for enhancing the transmittance of the liquid crystal display panel 100. An angle θ2 between the second trunk portion 126 and the second branch portions 127 in the second sub-pixels 103 is less than or greater than 45 degrees, i.e. not equal to 45 degrees (θ≠45°) for improving the color shift problem exiting in the VA type LCD apparatus.

In this case, the angle θ2 may be in the range of 10 degrees to 80 degrees except 45 degrees, for example in the range of 35 degrees to 55 degrees except 45 degrees (such as 55 or 40 degrees). Moreover, the second sub-pixels 103 are preferably positioned at one side of the first sub-pixels 102, and the first sub-pixels 102 are alternately arranged with the second sub-pixels 103 on the second substrate 120.

Figure 6:
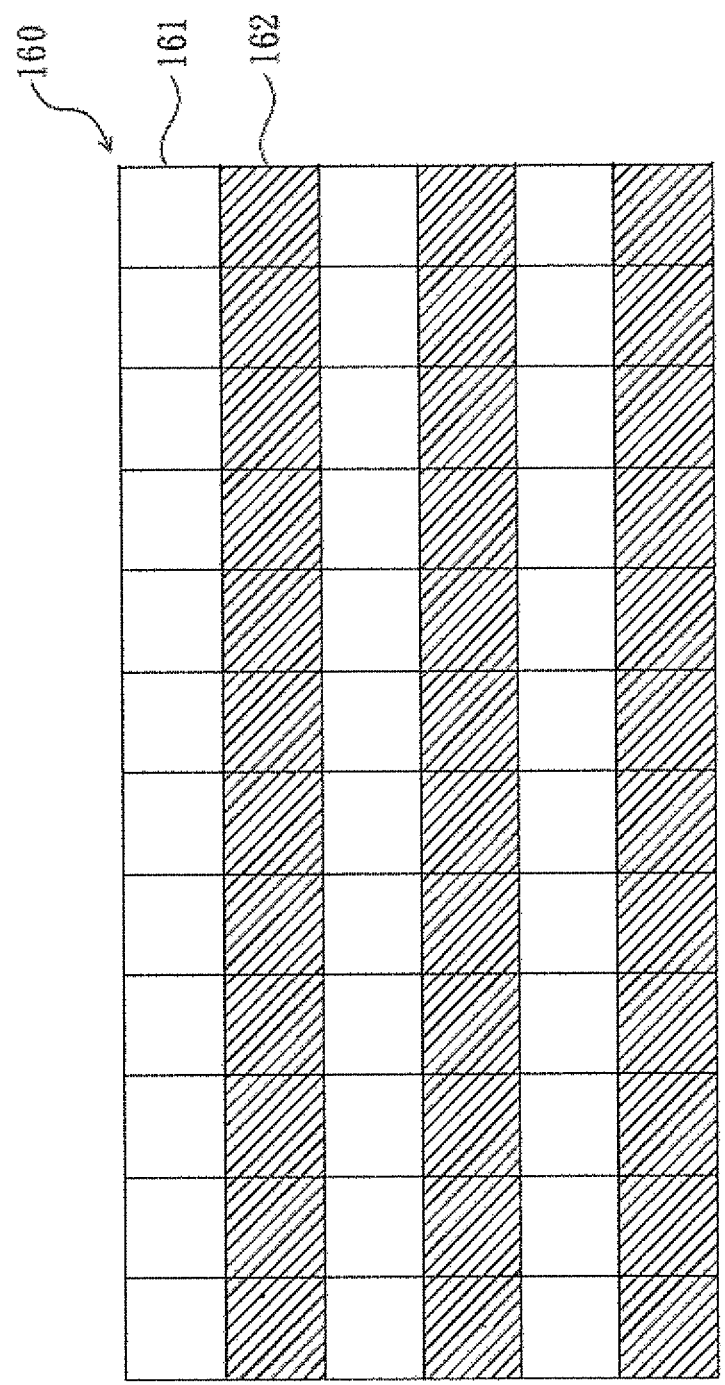
FIG. 6 is a schematic diagram showing the λ/4 pattern retarder film of the liquid crystal display panel according to one embodiment of the present invention.
Figure 7:
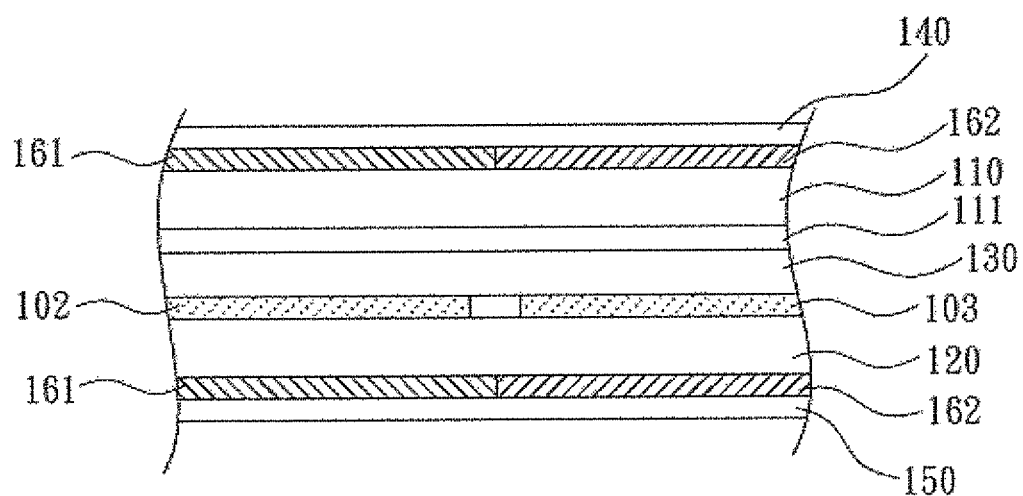
FIG. 7 is a cross-sectional view showing a liquid crystal display panel according to one embodiment of the present invention.

Referring to FIG. 6 and FIG. 7, FIG. 6 is a schematic diagram showing the λ/4 pattern retarder film of the liquid crystal display panel according to one embodiment of the present invention, and FIG. 7 is a cross-sectional view showing a liquid crystal display panel according to one embodiment of the present invention. Each of the λ/4 pattern retarder films 160 comprises a plurality of zero wave retarder rows 161 and a plurality of λ/4 retarder rows 162. The zero wave retarder rows 161 and the λ/4 retarder rows 162 are arranged in an alternating manner. The zero wave retarder rows 161 are positioned to the first sub-pixels 102, and the λ/4 retarder rows 162 are positioned to the sub-pixels 103. In this case, a width of the zero wave retarder rows 161 is about the same or similar to a width of the first sub-pixels 102, and a width of the λ/4 retarder rows 162 is about the same or similar to a width of the second sub-pixels 103. Therefore, the light rays passing through the first sub-pixels 102 can correspondingly pass through the zero wave retarder rows 161, and the light rays passing through the second sub-pixels 103 can correspondingly pass through the λ/4 retarder rows 162.

According to an optical theory, when an angle between a tilting direction of the liquid crystal molecules and an absorption axis of the polarizer is 45 degrees, the liquid crystal display panel can have a greatest transmittance. Therefore, in embodiments of the present invention, the transmittance of the liquid crystal display panel 100 can be enhanced by adjusting the polarized direction and angles of the light rays.

In the first sub-pixels 102, the light rays pass through the zero wave retarder rows 161 of the λ/4 pattern retarder films 160, and thus the polarized state of the light rays are not affected by the λ/4 pattern retarder films 160.

Figure 8:
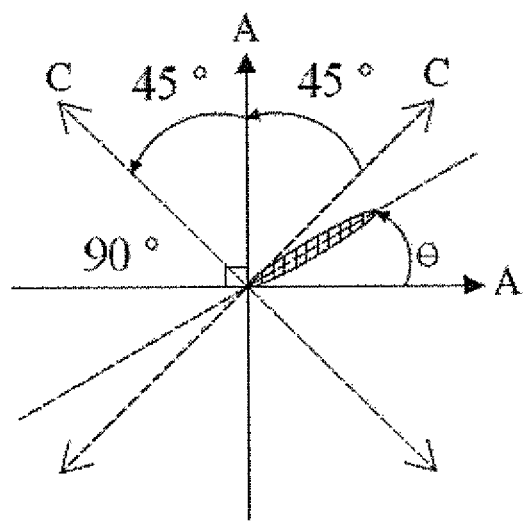
FIG. 8 is a schematic diagram showing different angles according to one embodiment of the present invention.

Referring to FIG. 8, a schematic diagram showing different angles according to one embodiment of the present invention is illustrated. In the second sub-pixels 103, the absorption axis of the first polarizer 140 may be vertical to the absorption axis of the second polarizer 150. That is, an angle between the absorption axes A of the first polarizer 140 and the second polarizer 150 is 90 degrees. In this case, an angle between slow axes C of the λ/4 retarder rows 162 of the two λ/4 pattern retarder films 160 is 90 degrees, and an angle between the axis C of the λ/4 retarder rows 162 and the absorption axis A of the polarizer 140 or 150 is 45 degrees.

Figure 9:
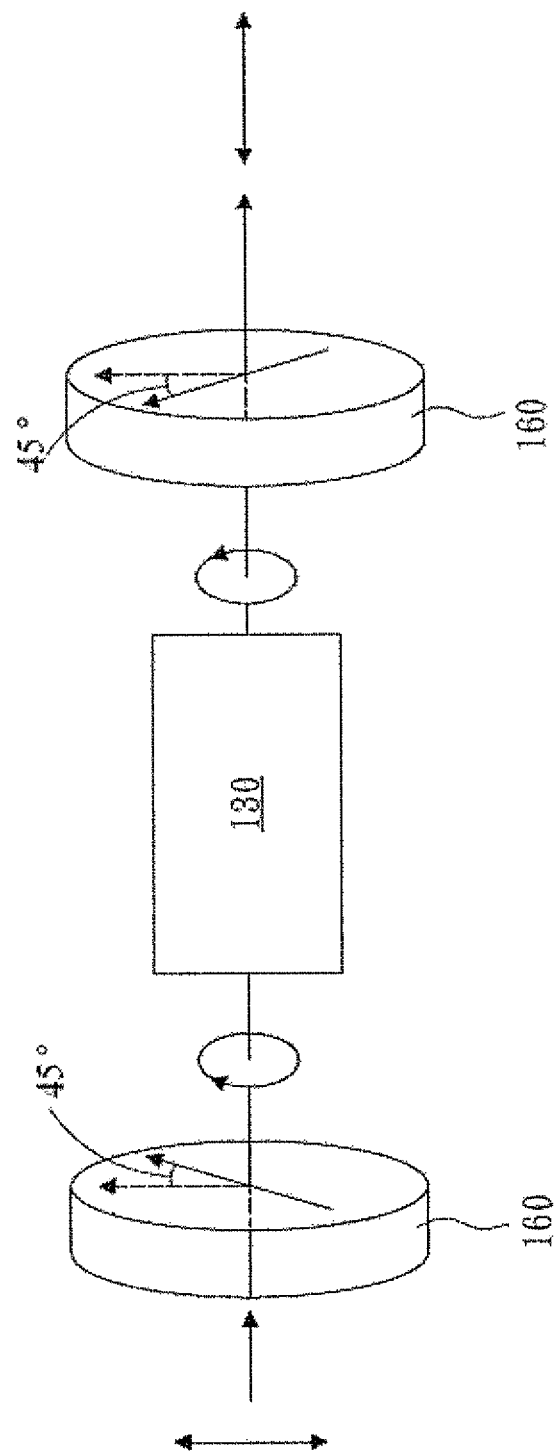
FIG. 9 is a schematic diagram showing polarized light rays according to one embodiment of the present invention.

Referring to FIG. 9, a schematic diagram showing polarized light rays according to one embodiment of the present invention is illustrated. In the second sub-pixels 103, when the light rays are emitted from the second polarizer 150 to the first polarizer 140 of the liquid crystal display panel 100, the linearly polarized light rays from the second polarizer 150 are transformed into left handed circularly polarized light rays or right handed circularly polarized light rays by the λ/4 retarder rows 162. Subsequently, the circularly polarized light rays are transformed into another kind of circularly polarized light rays by the liquid crystal layer 130 (i.e. a liquid crystal cell). At this time, the liquid crystal layer 130 can be equivalent to a λ/2 retarder film. Subsequently, the circularly polarized light rays can be transformed into linearly polarized light rays by the λ/4 retarder rows 1620, so as to allow the light rays to pass a transmission axis of the first polarizer 140. Therefore, in the liquid crystal display panel 100, the color shift problem can be improved by the second sub-pixels 103 with the angle θ2 (θ2≠45°), and the polarized direction and angles of the light rays can be adjusted by the λ/4 retarder rows 162 of the λ/4 pattern retarder films 160 for enhancing the transmittance of the second sub-pixels 103.

When images are displayed by the pixels 101 of the liquid crystal display panel 100, a first voltage V1 is applied to the pixel electrodes of the first sub-pixels 102, and a second voltage V2 is applied to the pixel electrodes of the second sub-pixels 103, and the first voltage V1 is higher than the second voltage V2 (V1>V2). In this case, a voltage difference (V1−V2) between the first voltage V1 and the second voltage V2 is inversely proportional to a grayscale of the images displayed by the pixels. Therefore, the lower the grayscale (or brightness) of the images displayed by the pixels 101 is, the larger the voltage difference (V1−V2) between the first sub-pixels 102 and the second sub-pixels 103 is. On the contrary, the higher the grayscale (or brightness) of the images displayed by the pixels 101 is, the less the voltage difference (V1−V2) between the first sub-pixels 102 and the second sub-pixels 103 is.

Therefore, in a normally black mode, when the images displayed by the pixels 101 have a low brightness (or grayscale), the voltage difference (V1−V2) between the first sub-pixels 102 and the second sub-pixels 103 in the pixels 101 can be getting larger, so as to enlarge a brightness difference between the first sub-pixels 102 and the second sub-pixels 103 for mitigating the viewing angle problem, as well as improving the display quality thereof. Herein, the viewing angle problem means that the displayed image effects differ between when the display is viewed from the front and when display is viewed obliquely.

In addition, the angle θ1 between the first trunk portion 124 and the first branch portions 125 in the first sub-pixels 102 is equal to 45 degrees, such that the angle between the tilting direction of the liquid crystal molecules and the absorption axis of the polarizer is 45 degrees. Thus, a display brightness of the first sub-pixels 102 can be higher than a display brightness of the second sub-pixels 103. Therefore, with the use of the different sub-pixels 102 and 103 having different angles in the pixels 101, the brightness difference between the first sub-pixels 102 and the second sub-pixels 103 can be further enlarged for further mitigating the viewing angle problem of the pixels.

In one embodiment, the angle θ2 between the second trunk portion 126 and the second branch portions 127 in the second sub-pixels 103 can be 36-38 degrees or 48-52 degrees, so as to mitigate the viewing angle problem of the pixels.

In one embodiment, when the images displayed by the pixels 101 have a low brightness (or grayscale), i.e. the brightness of the images displayed by the pixels 101 is lower a predetermined brightness, the voltage difference (V1–V2) between the first sub-pixels 102 and the second sub-pixels 103 can be larger than 1 V, such as in the range of 1V to 3V, so as to mitigate the viewing angle problem of the pixels.

As described above, in the LCD panel and the display apparatus of the present invention using the same, when the images displayed by the pixels have a low brightness, with the use of the different branch angles and the different driving voltages of the different sub-pixels in the pixels, the brightness difference between the different sub-pixels can be further enlarged, so as to mitigate the viewing angle problem of the pixels. Moreover, with the use of the pixel electrode structure, the color shift problem of the VA type LCD apparatus can be improved.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal display panel used in normally black mode, comprising:
   a first substrate comprising a first electrode;
   a second substrate comprising a second electrode, wherein the second electrode has a plurality of pixels, and each of the pixels comprises a first sub-pixel and second sub-pixel, and the first sub-pixel includes a first trunk portion and plurality of first branch portions, and an angle between the first trunk portion and the first branch portions is equal to 45 degrees, and the second sub-pixel includes a second trunk portion and plurality of second branch portions, and an angle between the second trunk portion and the second branch portions is in the range of 10 degrees to 80 degrees except 45 degrees;
   a liquid crystal layer formed between the first substrate and the second substrate;
   a first polarizer disposed at an outer side of the first substrate; a second polarizer disposed at an outer side of the second substrate; and
   two quarter wave pattern retarder films disposed between the first substrate and the first polarizer, and between the second substrate and the second polarizer, respectively, wherein the quarter wave pattern retarder films comprise a plurality of quarter wave retarder rows and a plurality of zero wave retarder rows, and the zero wave retarder rows are positioned to the first sub-pixels, and the quarter wave retarder rows are positioned to the second sub-pixels;
   wherein, when images are displayed by the pixels, a first voltage is applied to the first sub-pixels, and a second voltage is applied to the second sub-pixels, and a voltage difference between the first voltage and the second voltage is inversely proportional to a grayscale of the images displayed by the pixels, and the first voltage is higher than the second voltage;
   wherein a width of the zero wave retarder rows is the same to a width of the first sub-pixels, and a width of the quarter wave retarder rows is the same to a width of the sub-pixels, and a voltage difference between the first voltage and the second voltage is higher than 1 V when the brightness of the images displayed by the pixels is lower a predetermined brightness.

2. The liquid crystal display panel according to claim 1, wherein the angle between the second trunk portion and the second branch portions is in the range of 35 degrees to 55 degrees except 45 degrees.

3. The liquid crystal display panel according to claim 2, wherein the angle between the second trunk portion and the second branch portions is in the range of 36 degrees to 38 degrees.

4. The liquid crystal display panel according to claim 2, wherein the angle between the second trunk portion and the second branch portions is in the range of 48 degrees to 52 degrees.

5. The liquid crystal display panel according to claim 1, wherein an area of the first sub-pixel is equal to or larger than an area of the second sub-pixel.

6. The liquid crystal display panel according to claim 1, wherein the voltage difference between the first voltage and the second voltage is in the range of 1V to 3V when the brightness of the images displayed by the pixels is lower than the predetermined brightness.

7. A liquid crystal display panel used in normally black mode, comprising:
   a first substrate comprising a first electrode;
   a second substrate comprising a second electrode, wherein the second electrode has a plurality of pixels, and each of the pixels comprises a first sub-pixel and second sub-pixel, and the first sub-pixel includes a first trunk portion and plurality of first branch portions, and an angle between the first trunk portion and the first branch portions is equal to 45 degrees, and the second sub-pixel includes a second trunk portion and plurality of second branch portions, and an angle between the second trunk portion and the second branch portions is in the range of 10 degrees to 80 degrees except 45 degrees;
   a liquid crystal layer formed between the first substrate and the second substrate;
   a first polarizer disposed at an outer side of the first substrate; a second polarizer disposed at an outer side of the second substrate; and
   two quarter wave pattern retarder films disposed between the first substrate and the first polarizer, and between the second substrate and the second polarizer, respectively, wherein the quarter wave pattern retarder films comprise a plurality of quarter wave retarder rows and a plurality of zero wave retarder rows, and the zero wave retarder rows are positioned to the first sub-pixels, and the quarter wave retarder rows are positioned to the second sub-pixels;
   wherein, when images are displayed by the pixels, a first voltage is applied to the first sub-pixels, and a second voltage is applied to the second sub-pixels, and a voltage difference between the first voltage and the second voltage is inversely proportional to a grayscale of the images displayed by the pixels, and the first voltage is higher than the second voltage.

8. The liquid crystal display panel according to claim 7, wherein the angle between the second trunk portion and the second branch portions is in the range of 35 degrees to 55 degrees except 45 degrees.

9. The liquid crystal display panel according to claim 8, wherein the angle between the second trunk portion and the second branch portions is in the range of 36 degrees to 38 degrees.

10. The liquid crystal display panel according to claim 8, wherein the angle between the second trunk portion and the second branch portions is in the range of 48 degrees to 52 degrees.

11. The liquid crystal display panel according to claim 7, wherein a width of the zero wave retarder rows is the same to a width of the first sub-pixels, and a width of the quarter wave retarder rows is the same to a width of the sub-pixels.

12. The liquid crystal display panel according to claim 7, wherein an area of the first sub-pixel is equal to or larger than an area of the second sub-pixel.

13. The liquid crystal display panel according to claim 7, wherein a voltage difference between the first voltage and the second voltage is higher than 1 V when the brightness of the images displayed by the pixels is lower a predetermined brightness.

14. The liquid crystal display panel according to claim 13, wherein the voltage difference between the first voltage and the second voltage is in the range of 1V to 3V when the brightness of the images displayed by the pixels is lower than the predetermined brightness.

15. A display apparatus comprising:
   a backlight module; and
   a liquid crystal display panel comprising:
      a first substrate comprising a first electrode;
      a second substrate comprising a second electrode, wherein the second electrode has a plurality of pixels, and each of the pixels comprises a first sub-pixel and second sub-pixel, and the first sub-pixel includes a first trunk portion and plurality of first branch portions, and an angle between the first trunk portion and the first branch portions is equal to 45 degrees, and the second sub-pixel includes a second trunk portion and plurality of second branch portions, and an angle between the second trunk portion and the second branch portions is in the range of 10 degrees to 80 degrees except 45 degrees;
   a liquid crystal layer formed between the first substrate and the second substrate;
   a first polarizer disposed at an outer side of the first substrate; a second polarizer disposed at an outer side of the second substrate; and
   two quarter wave pattern retarder films disposed between the first substrate and the first polarizer, and between the second substrate and the second polarizer, respectively, wherein the quarter wave pattern retarder films comprise a plurality of quarter wave retarder rows and a plurality of zero wave retarder rows, and the zero wave retarder rows are positioned to the first sub-pixels, and the quarter wave retarder rows are positioned to the second sub-pixels;
   wherein, when images are displayed by the pixels, a first voltage is applied to the first sub-pixels, and a second voltage is applied to the second sub-pixels, and a voltage difference between the first voltage and the second voltage is inversely proportional to a grayscale of the images displayed by the pixels, and the first voltage is higher than the second voltage.

* * * * *